Figure 1:
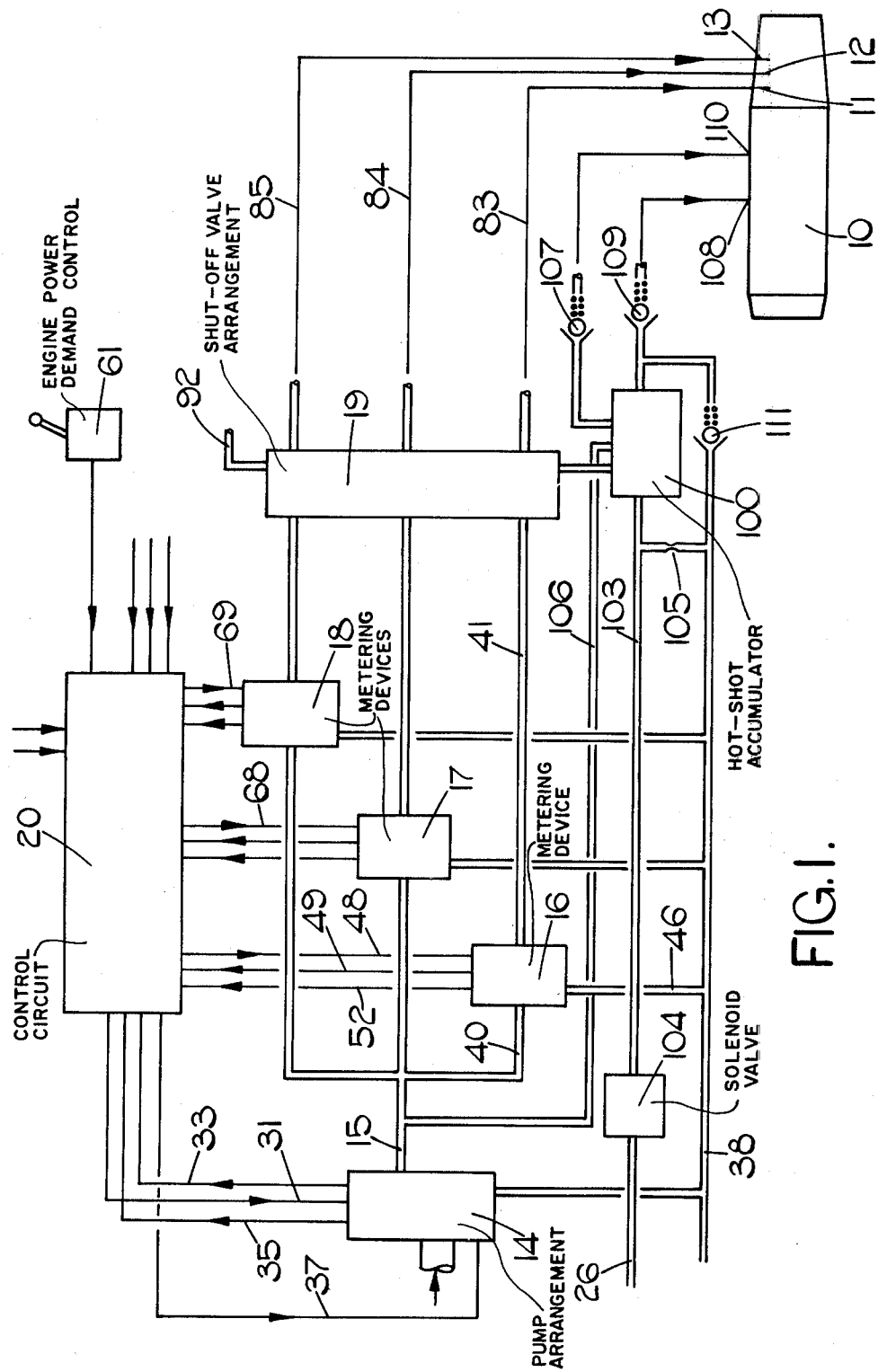

United States Patent [19]

Smith

[11] 4,229,939
[45] Oct. 28, 1980

[54] FUEL CONTROL FOR A GAS TURBINE ENGINE REHEAT SYSTEM

[75] Inventor: Trevor S. Smith, Sutton Coldfield, England

[73] Assignee: Lucas Industries Limited, Birmingham, England

[21] Appl. No.: 5,207

[22] Filed: Jan. 22, 1979

[30] Foreign Application Priority Data

Feb. 17, 1978 [GB] United Kingdom .................. 632578

[51] Int. Cl.³ .............................................. G05D 7/06
[52] U.S. Cl. ........................................ 60/243; 60/261
[58] Field of Search ................ 60/243, 233, 241, 261; 364/431

[56] References Cited

U.S. PATENT DOCUMENTS

| | | | |
|---|---|---|---|
| 3,857,241 | 12/1974 | Lewis | 60/243 |
| 3,913,317 | 10/1975 | Lewis | 60/243 X |

*Primary Examiner*—Jerry W. Myracle

[57] ABSTRACT

A fuel control for a gas turbine engine reheat system has a plurality of metering valves operated by an electrical control circuit for regulating fuel flow from a pump to respective burners of the reheat system. The pump has an inlet throttle which is also operated by the control circuit so that pump delivery is substantially equal to the sum of the detected fuel flows through the metering valves. The value of a measured pressure drop across one metering valve is compared with a desired value of that pressure drop, and a difference between these values is used to adjust the control signal to the pump inlet throttle, and thereby render the pump delivery more nearly equal to the aforesaid total flow.

6 Claims, 6 Drawing Figures

FUEL CONTROL FOR A GAS TURBINE ENGINE REHEAT SYSTEM

This invention relates to fuel control for gas turbine engine reheat system.

It is known, in gas turbine engines, to obtain extra thrust for short periods by providing a "reheat" or "after-burning" system to raise the temperature of the exhaust gases, and hence provide increased exhaust gas velocity.

A reheat system comprises a number of burners arranged in a duct downstream of the main engine turbine. The burners are commonly arranged concentrically within the exhaust gas duct and have differing fuel requirements and ignition characteristics. Conventionally, these burners are arranged in three groups, a primary burner and a "gutter" burner in the hot central gas stream and a "colander" burner in the cooler outer airstream. The fuel supplies to the burners are separately controlled in response to engine operating conditions and the position of an engine power demand control.

As shown in British Pat. No. 1456976 the fuel supply to the reheat burners is provided from a larger centrifugal pump which is driven from a shaft of the engine and which has an inlet throttle valve. Fuel flows to the individual burners are regulated by separate electrically controlled metering devices, the operating positions of these devices and the pressure drop across them being used to determine the actual metered flows. The pump inlet throttle valve is responsive to a fall, below a predetermined level, of the lowest of the three metering pressure drops. The intention is to render the pump delivery pressure sufficient to maintain an adequate pressure drop, and hence fuel flow, through the metering device which is the widest open.

It is a disadvantage of the foregoing system that the control loop for positioning the pump inlet throttle includes one of the metering valves. The size of the pump and the associated pipe work have the effect that an unacceptable delay may occur in response of the pump inlet throttle to changes in metering pressure drop, and vice versa. Since the pump inlet throttle will continue to move so long as the lowest pressure drop is below the aforesaid pre-determined level, these delays can result in either excessive or inadequate pump delivery, and give rise to oscillation of the system. The resultant instability can only be met by reducing the gain of the control loop, which will result in a poor pump response to changes in demanded flow. A rapid increase in demanded flow will cause the metering valves to become wide open in an attempt to provide a flow which the pump cannot supply until the pump inlet throttle has slowly responded to reduction in metering pressure drop. Pump delivery will be inadequate during this time, and one or more of the valves may remain in their wide open states even when pump delivery has restored the metered flow to its desired level. It is desirable to prevent the metering devices from approaching the wide open condition, since in this condition the flows through the devices may no longer be a predetermined function of the metering pressure drop. Furthermore, a rapid reduction of demanded fuel flow can cause the pump to attempt to supply more than the total metered flow, resulting in overheating of the fuel and imposing an unnecessary work load on the pump.

The foregoing problems may to some extent be overcome by providing that the pump inlet throttle is positioned in accordance with the sum of the separate desired reheat fuel flows, and by providing feedback signals corresponding to the position of the pump inlet throttle and pressure difference across the throttle, so that the pump delivery always corresponds to the total desired flow. It is necessary that pump delivery shall be sufficient to provide the required fuel flows to the several reheat burners, but it is also undesirable that pump delivery should exceed the total required flow by a significant amount. Such a result is, in practice, difficult to achieve in view of mechanical tolerances and fluctuations in pressure within the pump.

It is an object of the present invention to provide a reheat fuel control system in which the foregoing disadvantages are overcome, and in which the fuel delivery from the pump more nearly corresponds at all times to the sum of the separate required fuel flows.

According to the invention there is provided a fuel control system for a gas turbine engine reheat apparatus having a plurality of burners, the fuel control system comprising a plurality of metering valves for controlling fuel flow to the respective burners of the reheat system, a plurality of means for varying the effective flow areas of the respective valves, a plurality of means for detecting the pressure differentials across the respective valves, means, responsive to the aforesaid detected pressure differentials for determining the fuel flows through the respective valves, a fuel pump having an inlet throttle, means for generating a first control signal proportional to the sum of the determined fuel flows, means for generating a second control signal dependent on a pressure differential across one of said metering valves, and means responsive to said first and second control signals for controlling said pump inlet throttle.

Figure 2:
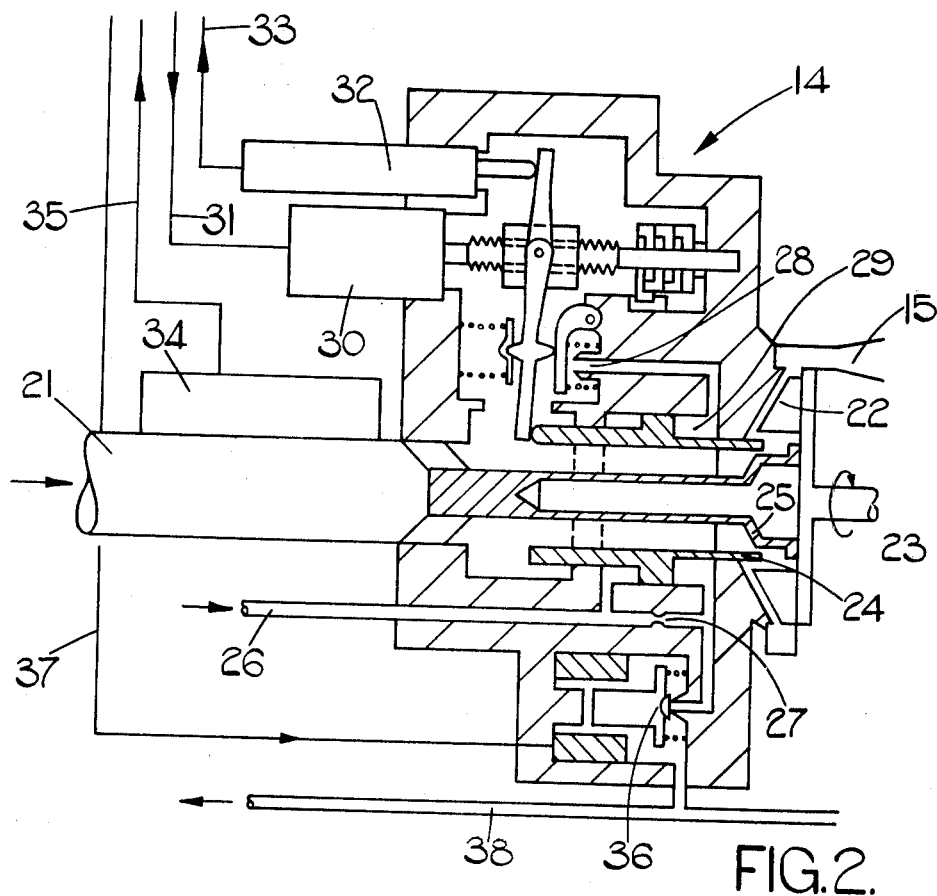
Figure 3:
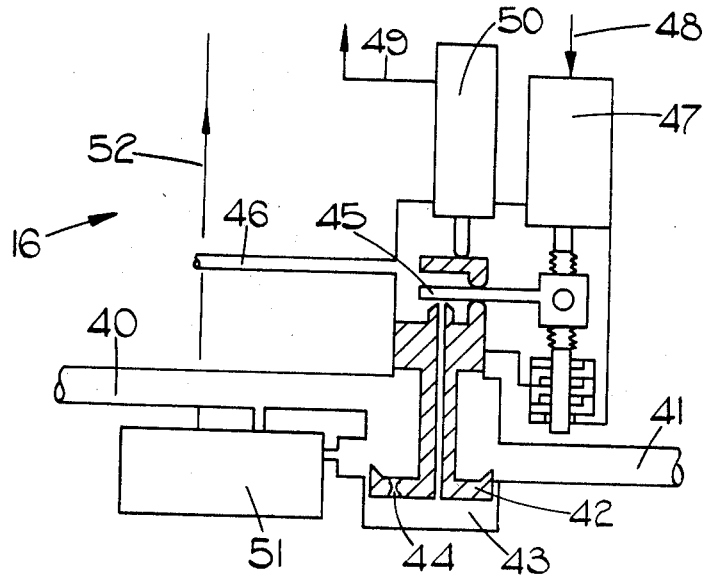
Figure 4:
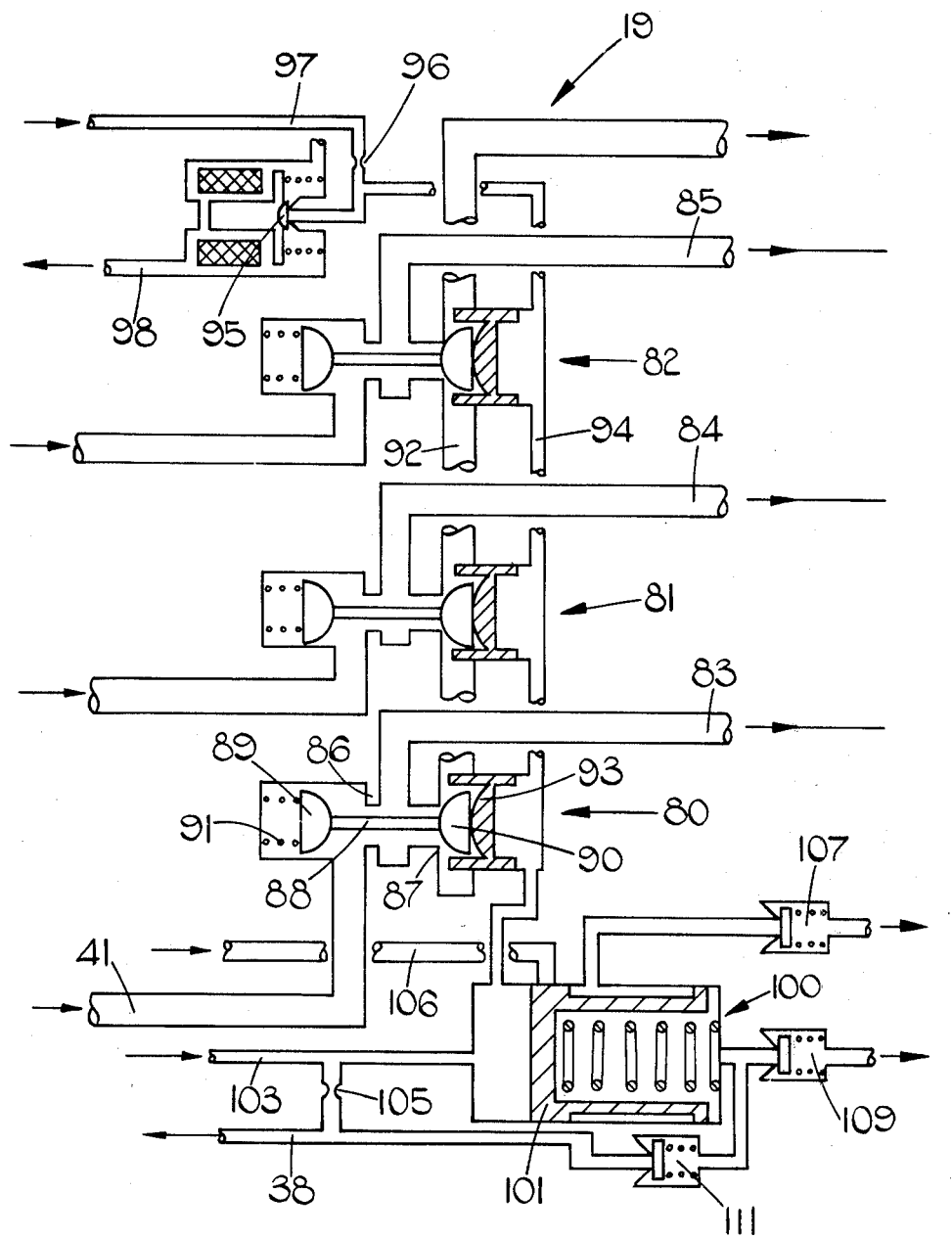
Figure 5:
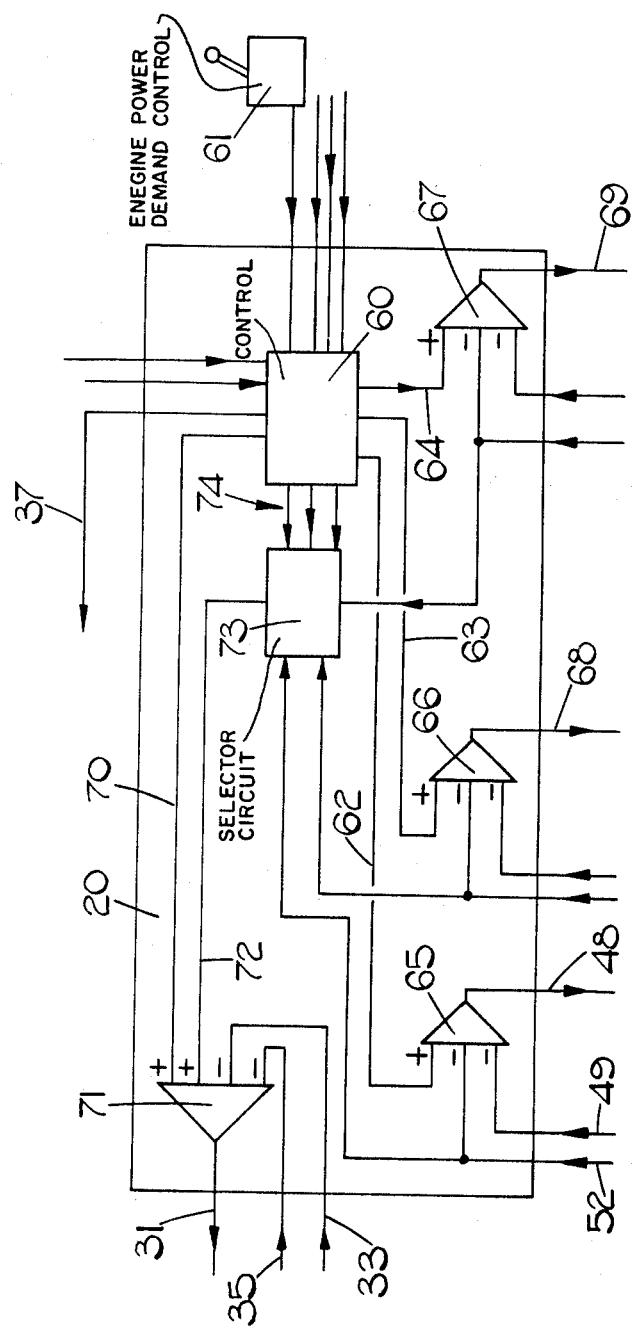
Figure 6:
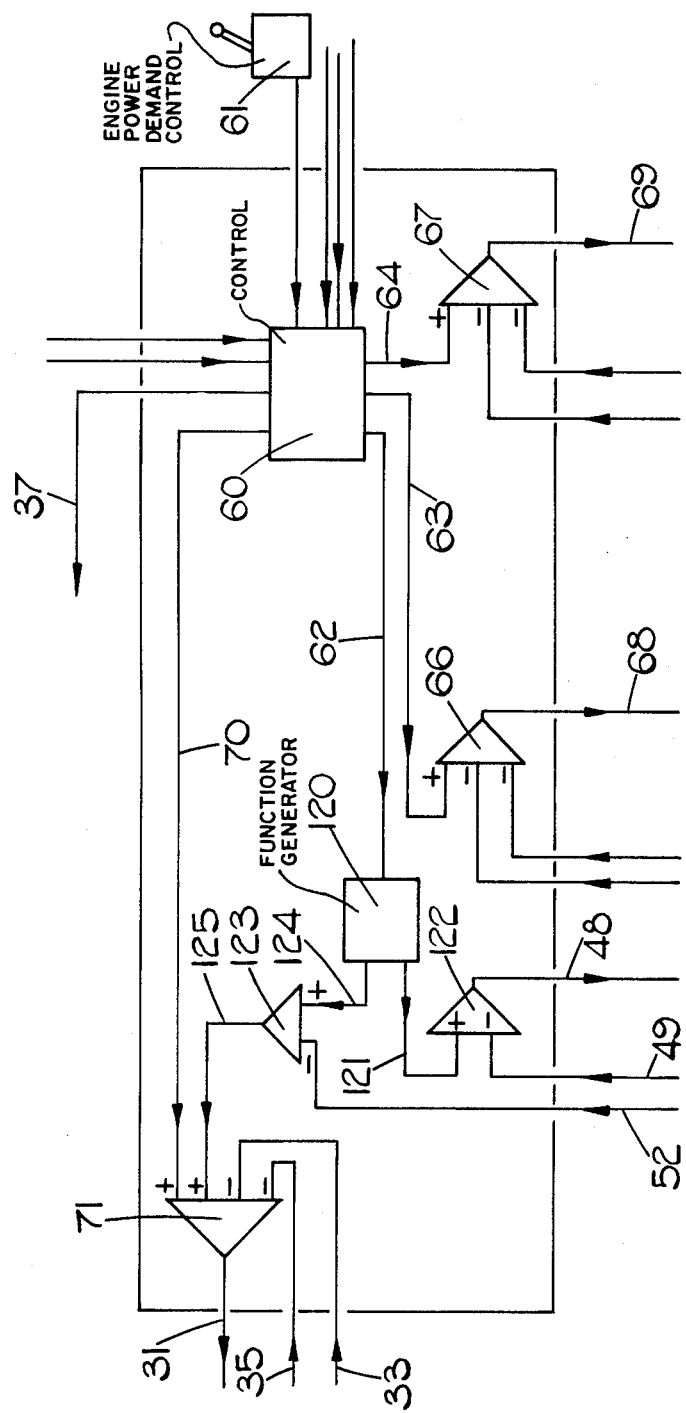

An embodiment of the invention will now be described by way of example only and with reference to the accompanying drawings in which:

FIG. 1 is a block diagram of a reheat fuel control system according to the invention, FIG. 2 shows, diagrammatically, a pump and inlet throttle arrangement, forming part of FIG. 1, FIG. 3 shows, diagrammatically, one of the three parallel metering devices of FIG. 1, FIG. 4 is a diagram of a combined shut off and distributor arrangement forming part of FIG. 1, FIG. 5 is a block diagram of the control circuit of FIG. 1, and FIG. 6 is a block diagram of an alternative control circuit.

A gas turbine engine 10 includes a reheat portion having a primary burner 11, a gutter burner 12 and a colander burner 13. Fuel is supplied to the burners 11, 12, 13 by a pump arrangement 14 shown in more detail in FIG. 2. The outlet 15 of the pump arrangement communicates with the burners by way of respective metering devices 16, 17, 18 one of which is shown in more detail in FIG. 3, and also by way of a combined distributor and shut off valve arrangement 19, shown in more detail in FIG. 4. A control circuit 20 is responsive to operating conditions of the engine 10 to control fuel delivery from the pump arrangement 14 and also to control the effective flow areas of the respective devices 16, 17, 18.

As shown in FIG. 2 the pump arrangement 14 has an inlet passage 21 through which fuel can flow to a centrifugal impeller 22 which is driven by a high pressure shaft 23 of the engine 10. A sleeve 24 is axially slidable relative to the impeller 22 and co-operates with a centre portion 25 of the impeller 22 to control the volume of fuel flowing through the pump. The sleeve 24 is urged rightward, as seen in the drawing, to reduce fuel flow through the pump, by high pressure fuel in a line 26, this fuel pressure being obtained from the main fuel supply to the engine 10. A fixed flow restrictor 27 and a pilot valve 28 are arranged in series between the line 26 and the inlet passage 21. The sleeve 24 is urged in a direction to increase fuel flow to the impeller 22 by a servo pressure in a chamber 29 intermediate the restrictor 27 and pilot valve 28.

The valve 28 is operated by an electric stepping motor 30 responsive to signals on lines 31 from the control circuit 20. The valve 28 is also responsive to the position of the sleeve 24, so that movement of the sleeve 24 in response to a change in the servo pressure in chamber 29 operates the valve 28 in a sense to oppose that change in pressure. A transducer 32 is responsive to the position of the sleeve 24 to provide a position signal on a line 33 to the control circuit 20. A transducer 34 is responsive to the pressure in the pump inlet passage 21 to provide a signal on a line 35 to the control circuit 20. A solenoid valve 36 is operable by a control signal on a line 37 to connect the passage 29 to a low pressure return line 38, and hence to permit the sleeve 24 to shut off fuel flow through the pump.

In use the impeller 22 causes centrifugal separation of the fuel into a radially outer liquid zone which passes to the pump outlet 15, and a radially inner zone at a lower pressure, this inner zone largely comprising air and fuel vapour. The zone immediately downstream of the pump inlet throttle provided by the sleeve 24 thus contains a mixture of fuel and vapour which is at the vapour pressure of the fuel. This vapour pressure has been found to be substantially constant in all operating conditions of the pump. In determining flow through the pump, therefore, it is necessary only to measure the fuel pressure up-stream of the inlet throttle in order to determine the pressure differential across this throttle, the constant vapour pressure being assumed. Fuel pressure measurement is effected by the transducer 34, and in combination with the signal from the transducer 32, provides an indication of the flow through the pump inlet throttle. Errors arising from vapour pressure fluctuations and from the profile of the valve sleeve 24 are corrected by means of the control circuit 20, in a manner to be described.

The fuel metering devices 16, 17, 18 are substantially identical, and the device 16 is shown in more detail in FIG. 3. The device 16 has an inlet passage 40 communicating with the pump outlet 15, and an outlet passage 41 communicating with the distribution and shut off valve arrangement 19. An axially slidable control element 42 is responsive to a servo pressure in a chamber 43. A fixed flow restrictor 44 and a pilot valve 45 are arranged in series between the inlet passage 40 and a low pressure connection 46, the connection 46 communicating with the low pressure return line 38. The pilot valve 45 is operable by an electric stepping motor 47 which is responsive to control signals on a line 48 from the control circuit 20. The pilot valve 45 is also responsive to the position of the control element 42, so that movement of the control element 42 in response to a pressure change in the chamber 43 results in operation of the pilot valve 45 in a direction to oppose that pressure change. A transducer 50 provides, on a line 49, a signal corresponding to the position of the control element 42, and hence of the effective flow area of the device 16. A further transducer 51 is responsive to the pressures in the passage 40, 41 to provide on a line 51, a signal corresponding to the pressure differential across the device 16.

The control circuit 20 includes a control 60 which is responsive to a signal from an engine power demand control 61 and also to signals from other transducers on the engine 10. These other transducers may measure such parameters as the air intake temperature and pressure, the air pressure downstream of the engine compressor, the speeds of the high pressure and low pressure shafts of the engine, and the jet pipe temperature and pressure. The function of the control 60 is to provide on respective lines 62, 63, 64, control signals corresponding to functions of the desired fuel flows through the respective metering devices 16, 17, 18. As previously indicated, the values of these desired fuel flows are in accordance with a predetermined schedule which is related to the various engine operating parameters and the position of the power demand control 61. The signals on lines 62, 63, 64 provide one input to respective ones of differential amplifiers 65, 66, 67. The other inputs to the amplifiers 65, 66, 67 are provided by the signals from the position transducers and differential pressure transducers in the respective metering devices. The amplifier 65 thus provides on the line 48, an error signal corresponding to a difference between desired and actual fuel flows through the device 16, the control element 42 remaining stationary in the absence of this error signal. The amplifiers 66, 67 similarly provide error signals to the respective metering devices 17, 18, on lines 68, 69.

The control 60 also provides, on a line 70 to a further differential amplifier 71, a signal which is a function of the total demanded flow through the devices 16, 17, 18. The amplifier 71 is responsive to the effective flow area signal on the line 33 and the pressure signal on the line 35 from the pump arrangement 14. The amplifier 71 provides, on the line 31 an error control signal which corresponds to the difference between desired total flow and actual pump delivery. However, as indicated above, by reason of assumptions made regarding the vapour pressure within the pump and also because of dimensional tolerances and other factors within the pump, the signals on the lines 33, 35 may not fully correspond with the actual pump delivery.

As previously indicated it is necessary that the pump delivery shall be adequate to provide the required fuel flows to the several reheat burners, but it is also undesirable that the pump delivery should exceed the total required flow by a significant amount.

Accordingly, therefore, the differential amplifier 71 is responsive to a signal on a line 72 from a selector circuit 73. Selector circuit 73 is responsive to the differential pressure signals from the respective metering devices 16, 17, 18 and also to signals on lines 74 from the control 60. The signals on lines 74 correspond to the desired pressure differentials across the respective devices 16, 17, 18 for a selected total reheat fuel flow.

The circuit 73 selects the lowest of the differential pressure signals and, in conjunction with the signal on the corresponding one of the lines 74, determines whether that differential pressure corresponds to its desired value. In the absence of such correspondence the circuit 73 provides a trimming signal on the line 72 to cause the signal on line 31 to vary the pump delivery. Pump delivery will continue to be varied until the lowest of the pressure difference signals has returned to its desired level. This has the effect that none of the metering devices approaches its wide open condition, and pump delivery pressure does not become excessive.

For example, if the device 16 is near its fully open position and the reheat schedule from the control 60 requires a further increase in fuel flow through the device 16 to the primary burners, this increase fuel flow can be provided only by further opening the device 16 by an unacceptable amount. However, the pump delivery is modified in accordance with the signal on line 72, so that the flow through pump will be increased until the desired pressure level is reached. The pump inlet throttle is thus positioned to ensure that the pump does not attempt to deliver more than the total required fuel flow, and if the pump delivery is less than the total fuel requirement, this will be reflected in the pressure differential across the widest-open metering device, and the signal on line 31 will be adjusted accordingly.

It is to be understood that the signal on the line 72 provides a slow trim of the position of the pump inlet valve sleeve 24, and does not provide the primary control of pump delivery. The arrangement ensures that an adequate pump delivery is maintained, while preventing excessive pump delivery which, as previously indicated, may result in overheating of the fuel.

As shown in FIG. 4 the distribution and shut-off valve arrangement 19 comprises identical two-way valves 80, 81, 82 which are operable to control fuel flow from the respective metering devices 16, 17, 18 via supply passages 83, 84, 95, to the respective reheat burners 11, 12, 13.

The valve arrangement 80 has a pair of seats 86, 87 and a dumb-bell shaped control member 88 which has part-spherical end portions 89, 90 respectively engageable with the seats 86, 87. The member 88 is biased by a spring 91 in a direction to engage the portion 89 with the seat 86 and thereby to isolate the metering device 16 from the supply passage 83. In this position of the control member 88 the supply passage 83 communicates with a drain or dump gallery 92. The member 88 is movable against the spring 91 by an axially aligned piston 93 which is responsive to a servo pressure in a further gallery 94. Supply of pressure to the gallery 94 is controlled by a solenoid valve 95 which is connected in series with a flow restrictor 96 between a high pressure fuel line 97 and a low pressure return line 98. The pressure in the gallery 94 is that between the valve 95 and restrictor 96.

The valves 81, 82 are movable in unison with the valve 80, in response to operation of the solenoid valve 95, either to permit fuel flow to the supply passages 84, 85 or to connect these passages to the dump gallery 92. The solenoid valve 95 is shut in response to a signal from the control circuit 20 when reheat fuel is to be supplied.

A "hot shot" accumulator 100 is indicated in FIG. 1 and shown in more detail in FIG. 4, and comprises a cylinder in which a piston 101 is biased in a first direction by a spring 102. The piston 101 is movable against the spring 102 by a high pressure signal in a line 103, this signal being derived from the pressure in line 26 by means of a solenoid valve 104 (FIG. 1). The line 103 communicates with the low pressure return line 38 by way of a flow restrictor 105. When reheat is selected the piston 101 is at the leftward extremity of its travel as seen in FIG. 4. In this position the pump outlet 15 communicates, via a passage 106 and a non-return valve 107 with a hot-shot relay injector 110 (FIG. 1) on the engine 10. When reheat is selected the pump starts to deliver fuel, which flows through the passage 106 and non-return valve 107 to the injector 110. After the reheat supply passages 83, 84, 85 and the burners 11, 12, 13 have been charged with fuel, the solenoid valve 104 is opened, urging the piston 101 to the right, causing the fuel volume within the cylinder to be discharged through a further non-return valve 109 to a further hot shot injector 108 in the engine. An ignition flame is thereby transferred from the main engine burners to the reheat burners by way of successive ignition of fuel from the injectors 108, 110. At the end of its rightward travel the piston 101 shuts off fuel flow to the valve 107 and the relay injector 108. The solenoid valve 104 is shut under control of the circuit 20, when reheat ignition has been completed. When the solenoid valve 104 is shut the piston 101 is maintained in its rightward position by the pressure in gallery 94, valve 95 being open while reheat flow is required. When reheat is shut down, valve 95 is shut and piston 101 moves to the left under the influence of its biasing spring, as the pressure in gallery 94 decays to low pressure through restrictor 105.

FIG. 6 shows a modification of the control circuit 20 previously described with reference to FIG. 5, corresponding parts having been assigned identical reference numerals.

As before, the control 60 provides, on the respective lines 62, 63, 64 control signals corresponding to functions of the desired fuel flows through the respective metering devices 16, 17, 18. Differential amplifiers 66, 67 provide metering error signals on respective lines 68, 69 and are responsive to feedback signals from the respective metering devices 17, 18. The signal on line 62 is supplied to a function generator 120 which provides, on a line 121, a signal corresponding to a desired operating position of the metering device 16 in response to the flow demand signal on line 62. A differential amplifier 122 is responsive to the signal on line 121 and to the position feedback signal on line 49 to provide the valve position error signal on line 48.

The pressure drop signal on line 51 from device 16 is applied to one input of a differential amplifier 123 whose other input is provided by a signal on a line 124. The signal on line 124 is obtained from the function generator 120, and corresponds to the required pressure drop across device 16 to provide a fuel flow commensurate with the demand signal on line 62. Any difference between the signals on lines 51 and 124 results in a trimming signal on a line 125 to the amplifier 71, to provide a slow trim of the error signal on line 31.

I claim:

1. A fuel control for a gas turbine engine reheat system having a plurality of burners, the fuel control system comprising a plurality of metering valves for controlling fuel flow to the respective burners of the reheat system, a plurality of means for varying the effective flow areas of the respective valves, a plurality of means for detecting the pressure differentials across the respective valves, means responsive to the aforesaid detected pressure differentials, for determining the fuel flows through the respective valves, a fuel pump having an inlet throttle, means for generating a first control signal proportional to the sum of the determined fuel flows, means for generating a second control signal dependent on a pressure differential across one of said metering valves, and means responsive to said first and second control signals for controlling said pump inlet throttle.

2. A control as claimed in claim 1 which includes means for generating a plurality of third control signals which are functions of the desired fuel flows through the respective metering orifices, said flow area varying means being responsive to respective ones of said third control signals.

3. A control as claimed in claim 1 or claim 2 which includes means for generating a fourth control signal which is a function of a desired pressure differential across said one of the metering valves, said means for generating the second control signals being responsive to said fourth control signal.

4. A control as claimed in claim 3 which includes means for generating a plurality of said fourth control signals which are functions of desired pressure differentials across respective ones of said metering valves, means for selecting which of said detected pressure differentials is the lowest, said means for generating the second control signal means for comparing said lowest pressure with the desired pressure for the valve from which said lowest pressure is derived, said second control signal being dependent on said comparison.

5. A control as claimed in claim 3 in which said means for generating the fourth control signal is responsive to one of said third control signals.

6. A control as claimed in claim 1 or claim 2 which includes means for determining fuel flow through said pump inlet throttle, said means for controlling the pump inlet throttle being responsive to said fuel flow.

* * * * *